United States Patent
Sayed et al.

(10) Patent No.: US 12,469,518 B1
(45) Date of Patent: Nov. 11, 2025

(54) RECESSED WRITE GAP MATERIAL FOR ENHANCED BIAS CURRENT INJECTION AND MAXIMIZING AERIAL DENSITY CAPACITY IN PERPENDICULAR MAGNETIC RECORDING

(71) Applicant: Headway Technologies, Inc., Milpitas, CA (US)

(72) Inventors: Shehrin Sayed, Fremont, CA (US); Yue Liu, Fremont, CA (US); Wenyu Chen, San Jose, CA (US); Haowen Ren, Fremont, CA (US); Kowang Liu, Fremont, CA (US); Yuhui Tang, Milpitas, CA (US)

(73) Assignee: Headway Technologies, Inc., Milpitas, CA (US)

( * ) Notice: Subject to any disclaimer, the term of this patent is extended or adjusted under 35 U.S.C. 154(b) by 0 days.

(21) Appl. No.: 18/818,344

(22) Filed: Aug. 28, 2024

(51) Int. Cl.
G11B 5/09 (2006.01)
G11B 5/012 (2006.01)
G11B 5/187 (2006.01)
G11B 5/31 (2006.01)

(52) U.S. Cl.
CPC ............ G11B 5/3116 (2013.01); G11B 5/012 (2013.01)

(58) Field of Classification Search
CPC . G11B 5/23; G11B 5/3906; G11B 2005/0021; G11B 2005/3996; G11B 5/012; G11B 5/11; G11B 5/1278; G11B 5/3133

USPC ........................................................... 360/59
See application file for complete search history.

(56) References Cited

U.S. PATENT DOCUMENTS 12,094,497 B1 9/2024 Sayed et al.
2024/0170010 A1* 5/2024 Wu .................... G06Q 30/0623

OTHER PUBLICATIONS

Reinsel, D. et al., "Data Age 2025, The Digitization of the World—From Edge to Core", IDC White Paper, #US44413318, Nov. 2018.
Zhu, J. et al., "Microwave Assisted Magnetic Recording", IEEE Transactions on Magnetics, vol. 44, No. 1, pp. 125-131, Jan. 2008.

* cited by examiner

Primary Examiner — Nabil Z Hindi
(74) Attorney, Agent, or Firm — DLA Piper LLP (US)

(57) ABSTRACT

The present embodiments relate to a magnetic write head structure that improves the maximum allowable bias current to maximize the current-assisted areal density capacity (ADC) gain in hard-disk-drive storage device. The write head can include a magnetic main pole (MP) and a trailing shield (TS) made of magnetic material that collects back the magnetic flux and a write gap (WG) between the MP and the TS that is comprised of a non-magnetic electrical conductor. The WG can include a height that is greater than an eTHd height of the HS that can increase an electrical contact area between the HS and MP for a bias current flow. The WG can further include a first part extending an air-bearing surface (ABS) plane of the write head to a top of the eTHd height and a second part extending from the top of the eTHd height.

18 Claims, 8 Drawing Sheets

RECESSED WRITE GAP MATERIAL FOR ENHANCED BIAS CURRENT INJECTION AND MAXIMIZING AERIAL DENSITY CAPACITY IN PERPENDICULAR MAGNETIC RECORDING

TECHNICAL FIELD

Embodiments of the invention relate to the field of electro-mechanical data storage devices. More particularly, embodiments of the invention relate to a write head for a disk drive with a spin-orbit torque assisted magnetic write head structure.

BACKGROUND

A magnetic recording medium (e.g., a magnetic disk) can store magnetic bits representing digital data. A magneto-resistive writer can be part of a hard disk drive (HDD) to write digital data to the magnetic recording medium.

As the overall amount of digital data being stored on HDD devices increases, there is an increasing demand for increased data capacity of HDD devices. One technique to increase data capacity for an HDD can include heat-assisted magnetic recording (HAMR) or microwave-assisted magnetic recording (MAMR). HAMR and MAMR techniques increase the density of HDDs by manipulating a portion of the magnetic recording medium, which can enhance the performance of the write head to the magnetic recording medium.

While improvements have been made, further developments and improvements are needed.

SUMMARY

The present embodiments relate to a magnetic write head structure that improves the maximum allowable bias current to maximize the current-assisted areal density capacity (ADC) gain in hard-disk-drive storage devices. The write head can include a magnetic main pole (MP) and a trailing shield (TS) made of magnetic material that collects back the magnetic flux and a write gap (WG) between the MP and the TS that is comprised of a non-magnetic electrical conductor. The write head can also include a side shield (SS), a leading shield (LS), and a write shield (WS) made of magnetic materials that prevent magnetic flux from reaching the medium bits away from the MP tip. The WG can include a height that is greater than an eTHd height of the HS that can increase an electrical contact area between the HS and MP for a bias current flow. The WG can further include a first part extending an air-bearing surface (ABS) plane of the write head to the top of the eTHd height and a second part extending from the top of the eTHd height. The eTHd height can comprise a height on part of the HS layer that is disposed adjacent to the tip portion of the MP at or around the write gap.

In the first example embodiment, a write head for a disk drive is provided. The write head can include a main pole (MP) configured to provide a magnetic flux to a recording medium. The write head can also include a trailing shield (TS) comprising a hot seed (HS) and write shield (WS) to collect a portion of the flux from the MP. The write head can also include a write gap (WG) disposed between the MP and TS. The WG can include a non-magnetic electrically conductive material.

The write head can also include a side shield (SS), a leading shield (LS), and a write shield (WS), each comprising a magnetic material that prevents magnetic flux from reaching the medium bits away from the MP. The write head can also include a side gap (SG) between the MP and the SS on multiple sides of the MP. The SG can include a non-magnetic material that is a conductor or an insulator. The write head can also include a leading gap (LG) between the MP and the LS, the LG comprising the same material as the SG.

In some instances, a length of the WG is disposed along a length of the SS and the LS and is about equal to a length of the HS.

In some instances, a thickness of the WG is about 17 nm to 25 nm.

In some instances, a height of the WG is greater than an eTHd height of the HS, which is configured to increase an electrical contact area between the HS and MP for a bias current flow.

In some instances, the WG comprises a first part extending an air-bearing surface (ABS) plane of the write head to a top of the eTHd height and a second part extending from the top of the eTHd height.

In some instances, a thickness of the first part of the WG is uniform across the ABS plane to the eTHd height. Further, a thickness of the second part of the WG can increase with the height of the WG and is based on a shape of the HS.

In some instances, the LG and the SG comprise an electrical insulator material comprising aluminum oxide ($Al_2O_3$).

In some instances, the LG and the SG comprise an electrical conductor comprising Ruthenium (Ru) or a Nickel-Chromium (Chromium) Ru (NiCr/Ru) multilayer.

In another example embodiment, a device is provided. The device can include a main pole (MP) and a trailing shield (TS) comprising a hot seed (HS) and write shield (WS). The device can also include a write gap (WG) disposed between the MP and TS, The WG can include a first part extending from an air-bearing surface ABS plane to a top of a eTHd height of the HS, and a second part from the top of the eTHd height.

The device can also include a side shield (SS), a leading shield (LS), and a write shield (WS). The device can also include a side gap (SG) between the MP and the SS on multiple sides of the MP. The device can also include a leading gap (LG) between the MP and the LS.

In some instances, a length of the WG is disposed along a length of the SS and the LS and is about equal to a length of the HS.

In some instances, a height of the WG is greater than the eTHd height of the HS, which is configured to increase an electrical contact area between the HS and MP for a bias current flow.

In some instances, a thickness of the first part of the WG is uniform across the ABS plane to the eTHd height and a thickness of the second part of the WG increases with the height of the WG and is based on a shape of the HS.

In some instances, the LG and the SG comprise an electrical insulator material comprising aluminum oxide ($Al_2O_3$).

In some instances, the LG and the SG comprise an electrical conductor comprising Ruthenium (Ru) or a Nickel-Chromium (NiCr) or a Nickel-Chromium-Ruthenium (NiCr/Ru) multilayer.

In another example, a method for manufacturing a write head for a disk drive is provided. The method can include providing a main pole (MP) configured to provide a magnetic flux to a recording medium. The method can also include disposing a trailing shield (TS) comprising a hot seed (HS) and write shield (WS) to collect a portion of the flux from the MP.

The method can also include disposing a write gap (WG) between the MP and TS, wherein the WG comprises a non-magnetic electrically conductive material. The method can also include providing each of a side shield (SS), a leading shield (LS), and a write shield (WS) to prevent magnetic flux from reaching the medium bits away from the MP. The method can also include disposing a side gap (SG) between the MP and the SS. The method can also include disposing a leading gap (LG) between the MP and the LS.

In some instances, a length of the WG is about equal to a length of the HS.

In some instances, a height of the WG is greater than an eTHd height of the HS, which is configured to increase an electrical contact area between the HS and MP for a bias current flow.

In some instances, the WG comprises a first part extending an air-bearing surface (ABS) plane of the write head to a top of the eTHd height and a second part extending from the top of the eTHd height.

In some instances, a thickness of the first part of the WG is uniform across the ABS plane to the eTHd height, and a thickness of the second part of the WG increases with the height of the WG and is based on a shape of the HS.

In some instances, the LG and the SG comprise an electrical insulator material comprising aluminum oxide ($Al_2O_3$) or an electrical conductor comprising Ruthenium (Ru) or a Nickel-Chromium (NiCr)/Ruthenium (Ru) multilayer.

Other features and advantages of embodiments of the present invention will be apparent from the accompanying drawings and from the detailed description that follows.

BRIEF DESCRIPTION OF THE DRAWINGS

Embodiments of the present invention are illustrated by way of example and not limitation in the figures of the accompanying drawings, in which like references indicate similar elements and in which.

DETAILED DESCRIPTION

A disk drive can include a write head to interact with a magnetic recording medium to read and write digital data to the magnetic recording medium. As the amount of digital data is required to be stored increases and with an increase in data aerial density of hard disk drive (HDD) writing, both the write head and digital data written to the magnetic recording medium can be made smaller.

The HDD industry has been a crucial part in the digital revolution, providing a storage technology for personal computers, servers, and data centers for several decades. With the exponential growth in data generation worldwide, the HDD industry can be used to address the massive demand for data storage. The growth rate of data generation from the world has been exponential in recent years, driven by the widespread use of digital devices, the internet, and cloud computing. According to recent studies, the amount of data generated worldwide is expected to reach 180 zettabytes (ZB) by 2025, up from 33 ZB in 2018.

Such a growth can largely depend on the shrinking media bits and the shrinking write head structures to match the smaller grains. The former can be achieved by larger coercive fields of media grains in perpendicular magnetic recording (PMR). However, the limitations in scaling can arise due to the degraded performance in shrinking write heads operating at the GHz frequency.

Figure 1:
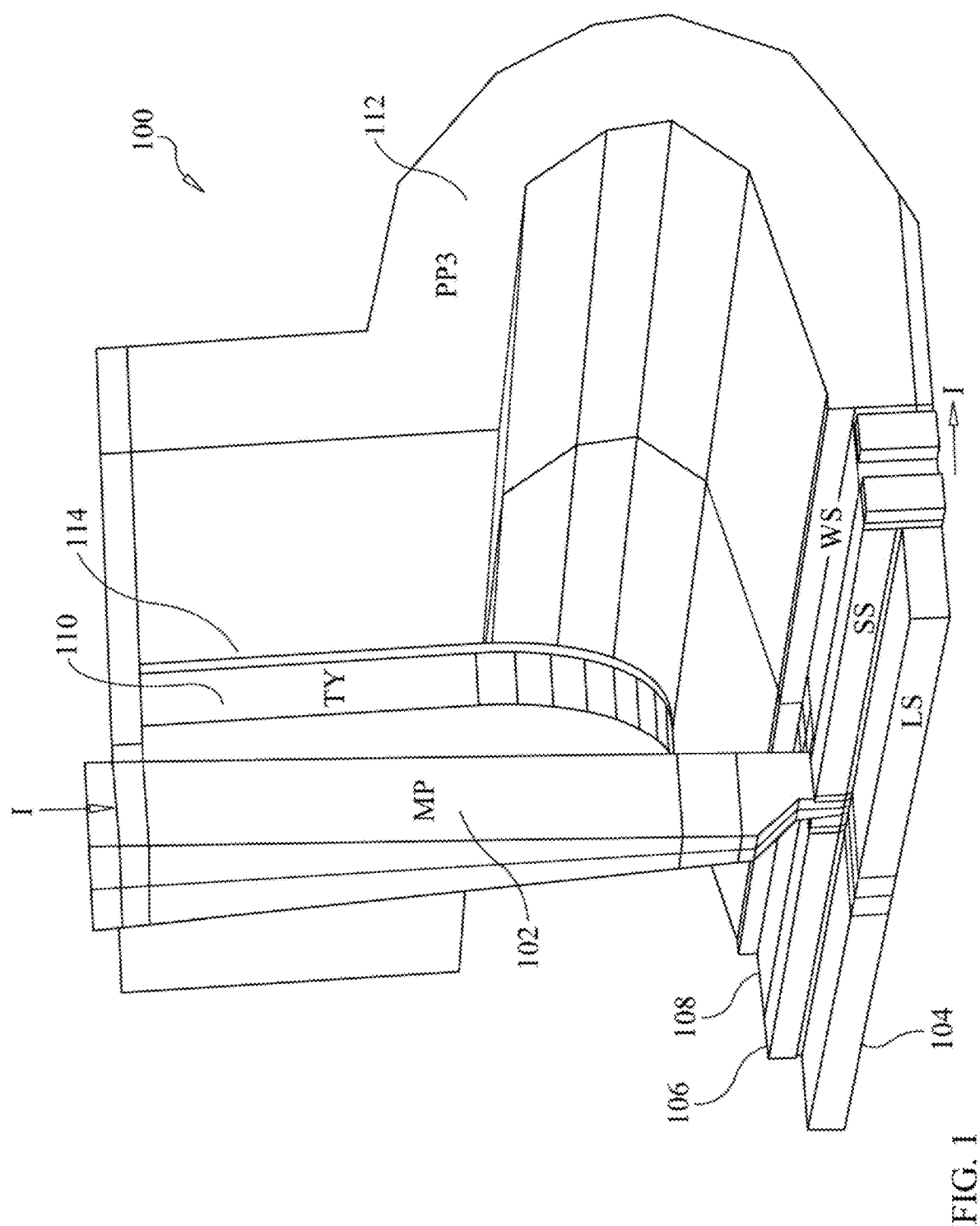
FIG. 1 illustrates an example Non-Dual-Write-Shield (nDWS) structure according to an embodiment.

FIG. 1 illustrates an example Non-Dual-Write-Shield (nDWS) structure 100. The structure can include any of a main pole (MP) 102, leading shield (LS) 104, side shield (SS) 106, write shield (WS) 108, top yolk (TY) 110, and return pole (PP3) 112. The TY 110 and PP3 112 can be electrically isolated using a thin insulator 114.

There is a growing interest in improving the write head performance in HDD by implementing an assist from heat and microwave sources, which can include heat-assisted magnetic recording (HAMR) and microwave-assisted magnetic recording (MAMR) technologies. Both the HAMR and MAMR technologies apply energy to the media from an external source to make it temporarily softer so that the degraded writability in the existing write heads is sufficient. To recover the degradation of many PMR write heads, an assistive technology can run a current through the main pole of the write head to minimize unwanted domain formation. These current-assisted designs can achieve improvements due to magnetization rotation from the current-induced Oersted field distribution.

One such current-assist structure can include the tunable pole protrusion (TPP) structure which uses a bias current that enters the write gap (WG) material from the main pole and exits from one of the sides of the write shield (WS). The write gap material in a TPP material can include ruthenium (Ru) or a Nickel-Chromium (NiCr)/Ruthenium (Ru) multilayer. The length of the write-gap material can be the hot seed width, the thickness of the write-gap material can be the write gap of the writer, and the width of the write-gap material can be up to the extended throat (eTHd) height on the hot seed (HS). The eTHd height can comprise a height on part of the HS layer that is disposed adjacent to the tip portion of the MP at or around the write gap. Such a design can be shown in FIGS. 2A-2B.

Figure 2A:
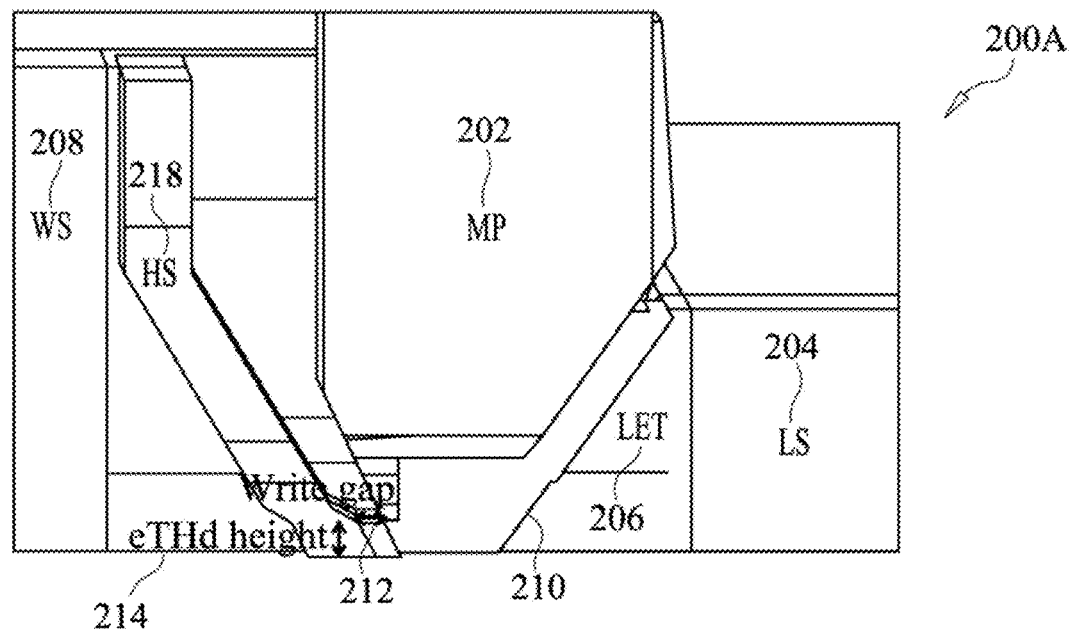
FIG. 2A illustrates a cross-section view of a TPP write head structure according to an embodiment.
Figure 2B:
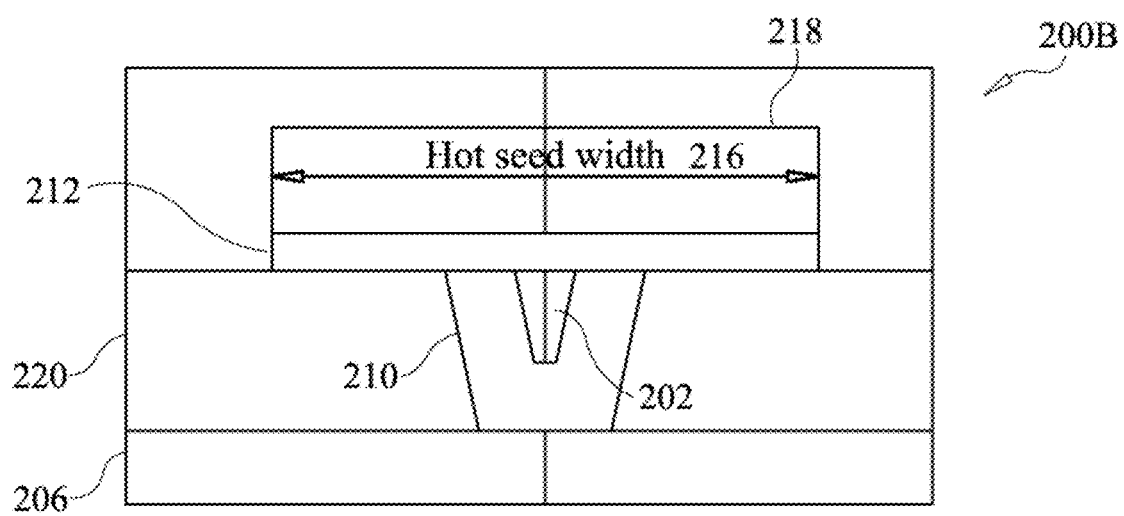
FIG. 2B illustrates an air-bearing surface (ABS) view of a TPP write head structure according to an embodiment.
Figure 2C:
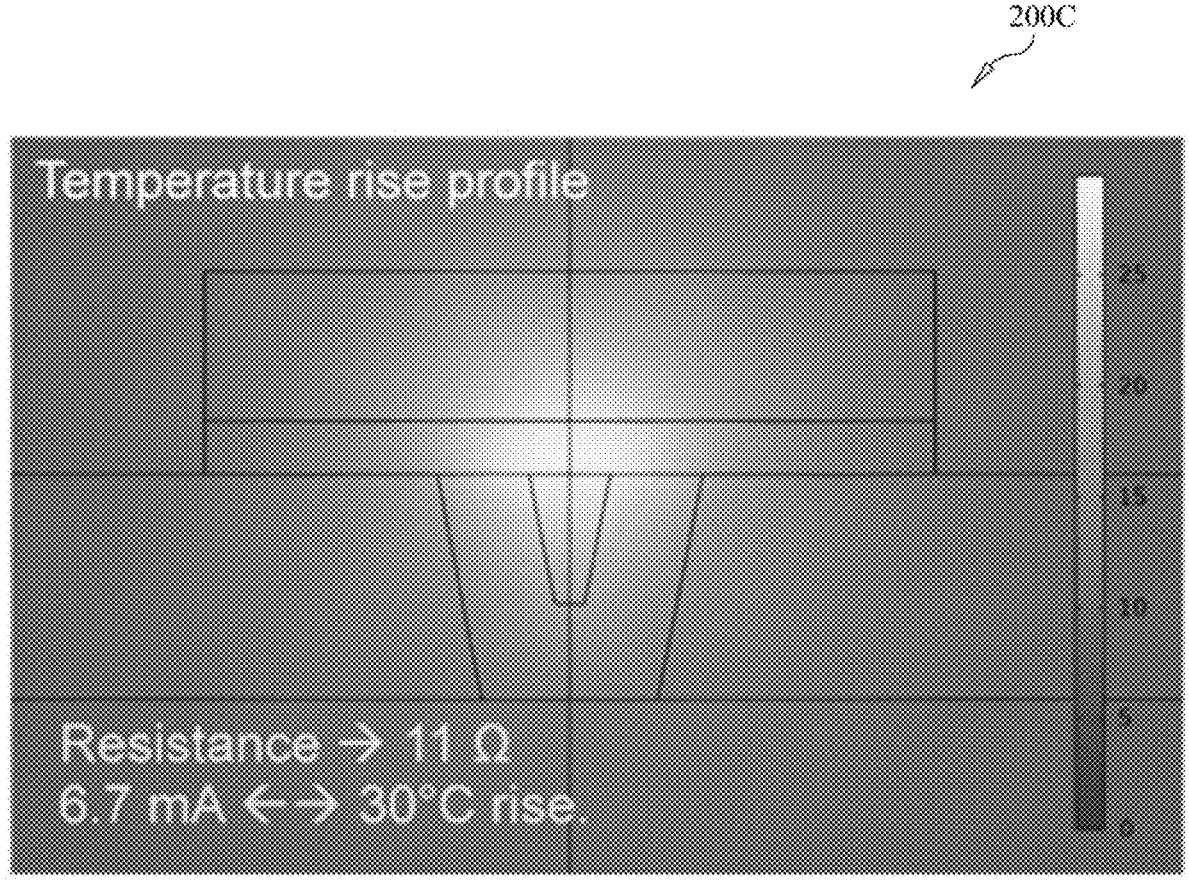
FIG. 2C illustrates a temperature rise profile on the ABS plane of a TPP structure according to an embodiment.

FIGS. 2A-2C illustrate views and aspects of a TPP write head structure. FIG. 2A illustrates a cross-section view of a TPP write head structure 200A. As shown in FIG. 2A, the main pole 202 can be disposed adjacent to a LET 206. Further, the structure 200A can include a LS 204, WS 207, and a hot seed (HS) layer 218. A side gap 210 can be formed between MP 202 and side shield (SS) layer 220. A write gap 212 can be formed between MP 202 and HS 218. Additionally, an eTHd height 214 can be around or the same as a height at the write gap 212.

FIG. 2B illustrates an air-bearing surface (ABS) view of a TPP write head structure 200B. As shown in FIG. 2B, a HS width 216 of the HS 218 can be around the same as the write gap material 212.

FIG. 2C illustrates a temperature rise profile on the ABS plane of a TPP structure 200C. In the POR structure, the eTHd height can be around 30 to 40 nm. The bias current in the TPP structure can flow through a small cross-section in the write gap and results in a larger device resistance in the order of 11Ω.

Such a bias-current flow in the TPP structure can generate a Joule heating in the write gap and main pole tip and increase the temperature depending on the strength of the current, which can be shown in FIG. 2C, for example. The reliability limit of the write head structure can allow a 30° C. temperature rise, which corresponds to the 6.7 mA as the maximum allowable bias-current. The maximum allowable bias-current can be very small and limits from utilizing the full TPP effect-assisted ADC gain.

Figure 3A:
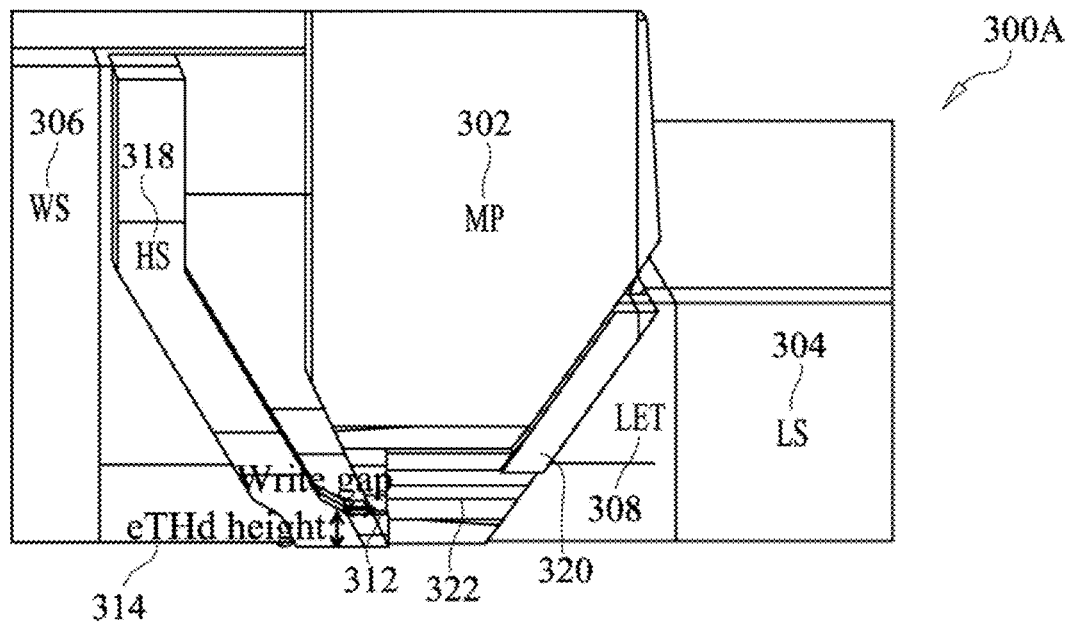
FIG. 3A illustrates a cross-section view of a cTPP write head structure according to an embodiment.
Figure 3B:
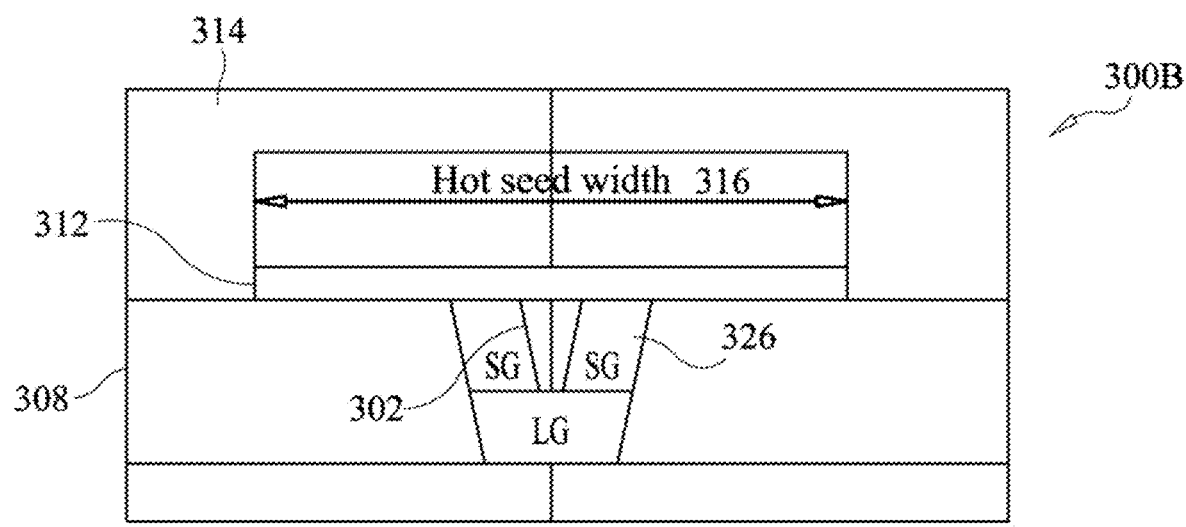
FIG. 3B illustrates an ABS view of a cTPP write head structure according to an embodiment.

In order to decrease the device resistance and increase the maximum allowable bias current, a cTPP structure can be implemented where the leading gap (LG) 324 and side gap (SG) 326 are also filled with ruthenium to enhance the contact area of the bias current flow, as are shown in FIGS. 3A-3B, for example.

FIG. 3A illustrates a cross-section view of a cTPP write head structure 300A. As shown in FIG. 3A, the structure can include a MP 302, LS 304, WS 306, LET 308, and HS 318. Further, the leading gap (LG) 320 and side gap (SG) 322 can include Ruthenium as described herein. The eTHd height 314 can be around that of the write gap 312.

FIG. 3B illustrates an ABS view of a cTPP write head structure 300B. As shown in FIG. 3B, the HS width 316 can be around a width of the write gap material 312.

A cTPP structure with POR dimensions can lead to a device resistance of around 5.5 ohms (52), which in turn can correspond to a higher maximum allowable bias-current of 16 mA.

Figure 3C:
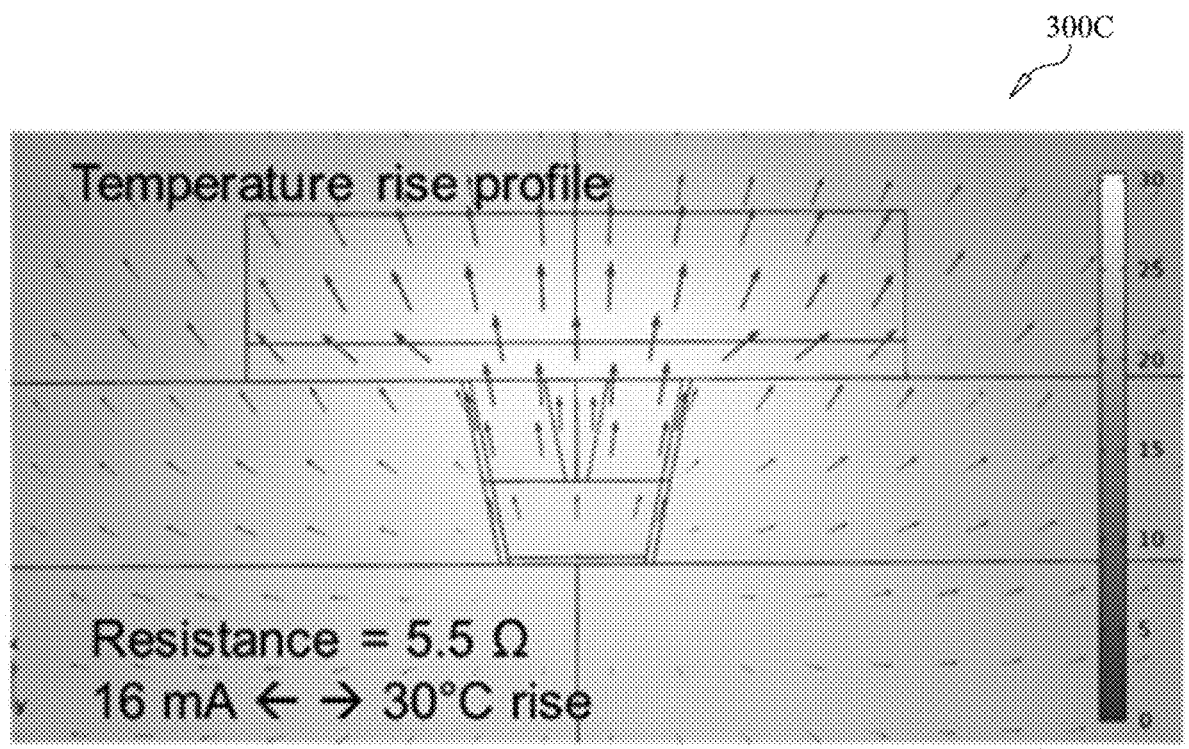
FIG. 3C illustrates an example temperature rise profile on the ABS plane of a cTPP structure according to an embodiment.

In this case, the temperature rise can be more spread around the main pole, as shown in FIG. 3C, for example. FIG. 3C illustrates an example temperature rise profile 300C on the ABS plane of a cTPP structure. However, the cTPP structure can distribute the majority of the bias-current in the leading and side gaps. In a POR structure, the ratio of the leading and side gap current to the write gap current can be about 1.7 to 2.7 times. Thus, for the same total bias current, the original ADC gain of the TPP effect from the bias current flowing in the write gap is reduced. Also, the ADC gain may scale poorly with the bias current in the leading and side gap. In addition, the side gap current is also shown to induce additional adjacent track interference in the write head, which can degrade the overall performance.

The write head structures as described herein can reduce a device resistance of the TPP-assist scheme and significantly increase the maximum allowable bias-current for higher ADC gain. Further, the write head structures can enhance the write gap current in a cTPP structure to maximize the TPP-assist effect.

The present embodiments can provide a magnetic write head structure that improves the maximum allowable bias current to maximize the current-assisted areal density capacity (ADC) gain in hard-disk-drive storage device.

In a first example, a non-dual-write-shield (nDWS)-based write head structure can include a magnetic main pole (MP) that provides a strong and concentrated magnetic flux to write the medium bit. The write head can also include a trailing shield (TS) made of magnetic material that collects back the magnetic flux and a write gap (WG) between the MP and the TS that is comprised of a non-magnetic electrical conductor. The write head can also include a side shield (SS), a leading shield (LS), and a write shield (WS) made of magnetic materials that prevents magnetic flux from reaching the medium bits away from the MP tip.

The write head can also include a side gap (SG) between the MP and the SS on both sides of the MP tip, composed of non-magnetic materials that can be either a conductor or an insulator, a leading gap (LG) between the MP and the LS, composed of the same material as the SG, and a coil wrapping around the MP through a magnetic PP3 shield that takes a time-dependent write current to saturate the MP magnetization.

In some instances, the WG material between the hot seed (HS) and the MP can have a length (along the length of SS and LS) that is equal to the hot seed width. The thickness of the WG material can be around equal to the WG thickness of the write head.

In some instances, the height of the WG material can be taller than that of the eTHd height of the HS, which can ensure larger electrical contact area between the HS and the MP for bias current flow. The WG material from the ABS plane up to the eTHd height can be about same as another TPP structure and the additional part is referred here as the recessed WG material.

In some instances, the thickness of the WG material is roughly uniform from the ABS plain up to the eTHd height and can equal to the WG thickness of the write head. The thickness of the recessed part of the WG material can gradually increase with its height, as determined by the shape of the HS.

In some instances, the LG and SG material can be an electrical insulator like $Al_2O_3$. This structure can be referred to as a TPPv1 structure. The recessed WG material in a TPPv1 structure can provide up to ~46% reduction in the device resistance for a 100 nm WG material height as compared to a conventional POR TPP structure with WG material only up to the eTHd height of 30 nm. This improvement in the device resistance can correspond to a 79% enhancement in the maximum allowable bias current within the reliability margin for maximizing the ADC gain.

In some instances, the LG and SG material can be an electrical conductor like Ru or NiCr/Ru multilayer. This structure can be referred to as a cTPPv1 structure. The recessed WG material in a cTPPv1 structure can provide a 3% reduction in the device resistance for a 100 nm WG material height as compared to another POR cTPP structure with WG material only up to the eTHd height of 30 nm. The minimal sensitivity of the device resistance with respect to the recessed WG material height can be due to the fact that the resistance is dominantly determined by the LG and SG material contact area on the MP. However, the WG current can be enhanced by 26% in a cTPPv1 structure with 100 nm WG material height as compared to a POR cTPP structure.

Figure 4A:
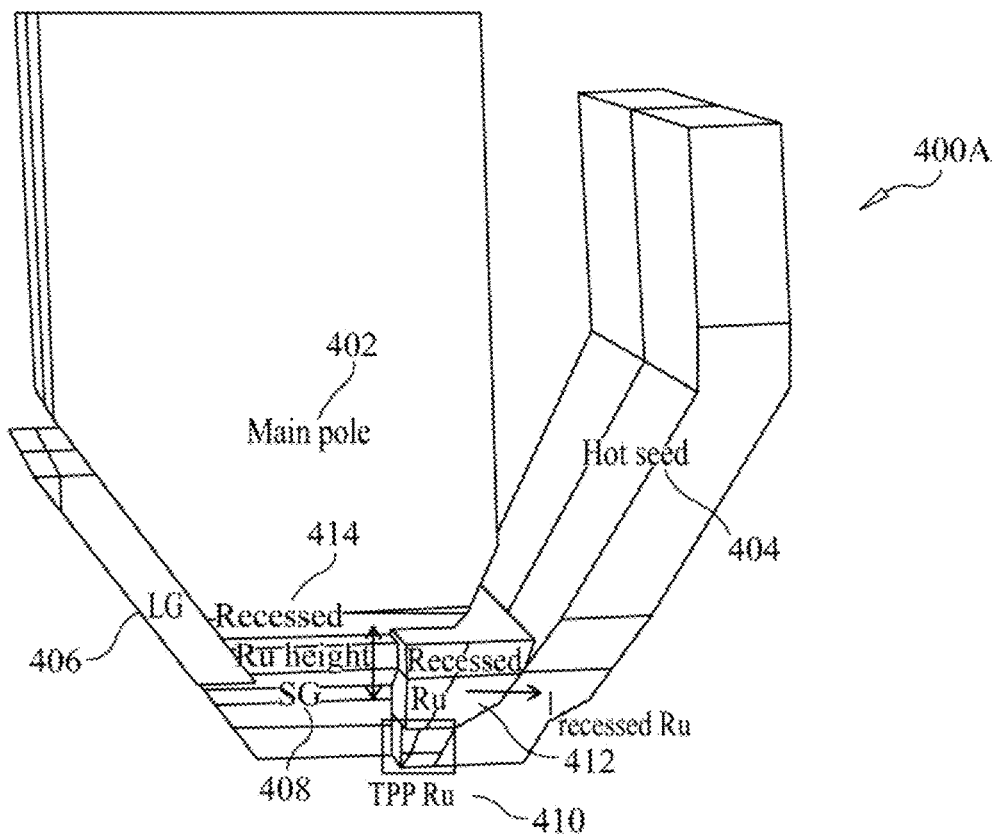
FIG. 4A illustrates an example write head TPP or cTPP structure with WG having the TPP Ru (or NiCr/Ru multilayer) and an additional recessed Ru (or NiCr/Ru multilayer) according to an embodiment.

In a first example, a write head structure can include a TPP structure with a WG material and an additional recessed WG material. The above-mentioned challenges can be resolved by an additional Ru or NiCr/Ru multilayers in the write gap beyond the eTHd height into the ABS, as shown in FIG. 4A, for example. The recessed WG material can allow for more cross-sectional area for the WG current to flow. Thus, the resistance of the device can be expected to decrease, and the maximum allowable bias current can be expected to increase.

FIG. 4A illustrates an example write head TPP or cTPP structure with WG having the TPP Ru (or NiCr/Ru multilayer) and an additional recessed Ru (or NiCr/Ru multilayer). As shown in FIG. 4A, the structure 400A can include a MP 402, HS 404, LG 406, and SG 408. Further, a TPP Ru layer 410 can be disposed adjacent to a recessed Ru 412. A height of the recessed Ru (414) can be 10 nm to 100 nm depending on the required bias current specifications for maximizing the areal density capacity.

Figure 4B:
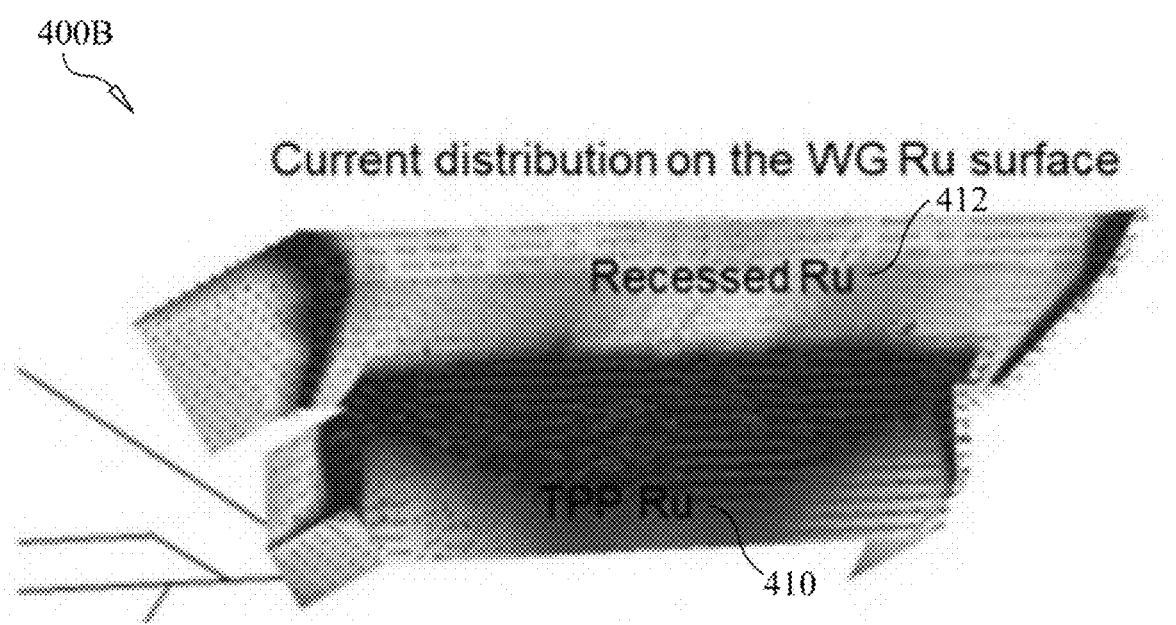
FIG. 4B illustrates an example current flow distribution in the WG material according to an embodiment.

FIG. 4B illustrates an example current flow distribution in the WG material. As shown in FIG. 4B, the current distribution 400B of the recessed Ru 412 and TPP Ru 410 an be more crowded in the WG material below the eTHd height.

Due to the structure of the HS, the WG material thickness in other structures can equal the WG thickness, and it can be uniform from the ABS up to the eTHd height. The additional recessed WG material thickness can increase gradually as its height is increased beyond the eTHd height on the HS. Since the current flows from the MP to HS or vice versa, the current density distribution can be more crowded in the WG material below the eTHd height, as shown in FIG. 4B. The current density can be more spread in the recessed part of the WG material, and it can help with lowering the device resistance.

The SG and LG materials in the structures as described herein can be an electrical insulator like $Al_2O_3$ (similar to the TPP structure in FIG. 2), which can be referred to a TPPv1 structure. On the other hand, the SG and LG materials in the structure can be conductors like Ru (similar to the cTPP structure in FIG. 3), which can be referred to a cTPPv1 structure.

Figure 5A:
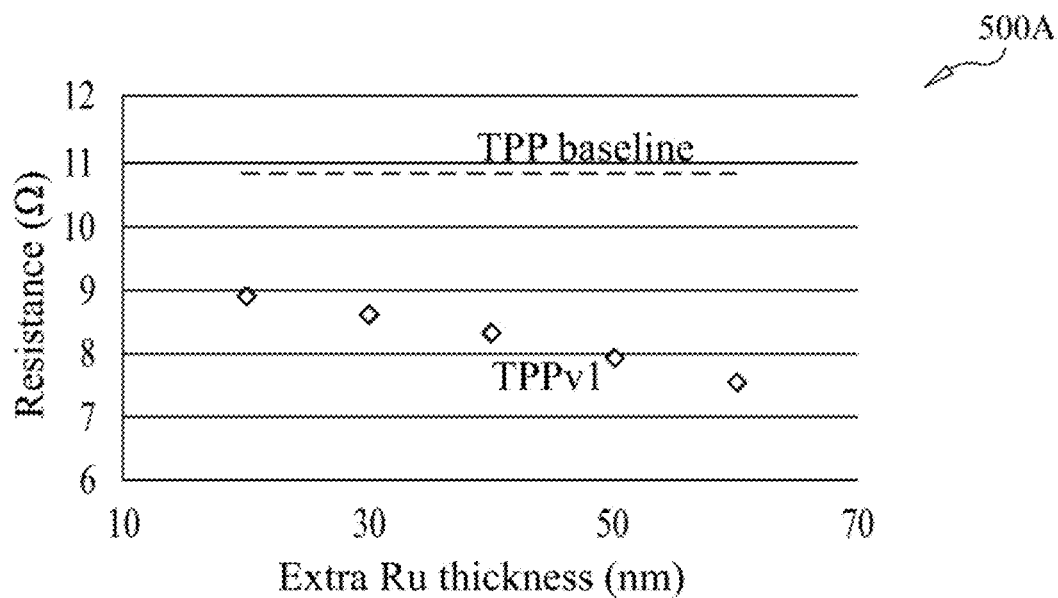
FIG. 5A illustrates a graphical representation of a device resistance of TPPv1 structures and comparison with the TPP baseline structure according to an embodiment.

When the recessed TPP Ru height of a TPPv1 structure is 0 nm, the height can correspond to another TPP structure with a baseline resistance of 11 Ω, as shown in FIG. 5A, for example. The TPPv1 device resistance can decrease with the recessed Ru height and can be as low as 7.5 Ω when the additional recessed Ru height is ~60 nm (e.g., in FIG. 5A). This reduction in the device resistance can correspond to the maximum allowable bias current of 11 mA (see FIG. 5B), which can be around 79% higher than other TPP structures with POR dimensions and can lead to higher current-assisted ADC gain.

Figure 5B:
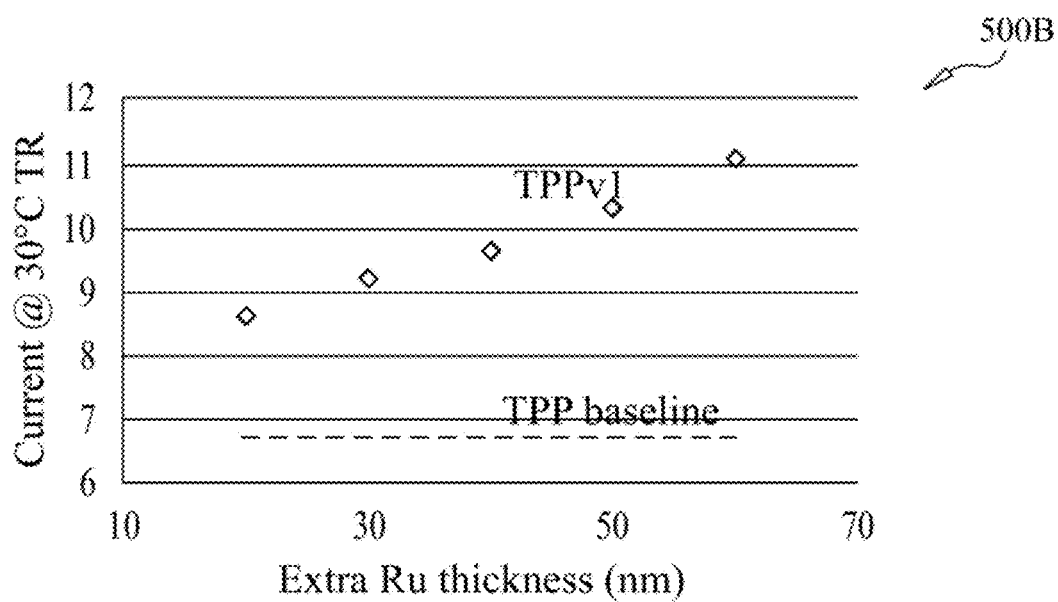
FIG. 5B illustrates a graphical representation of a maximum allowable bias current in TPPv1 structures and comparison with the TPP baseline structure according to an embodiment.

FIG. 5A illustrates a graphical representation 500A of a device resistance of TPPv1 structures and comparison with the TPP baseline structure. FIG. 5B illustrates a graphical representation 500B of a maximum allowable bias current in TPPv1 structures and comparison with the TPP baseline structure.

Figure 6A:
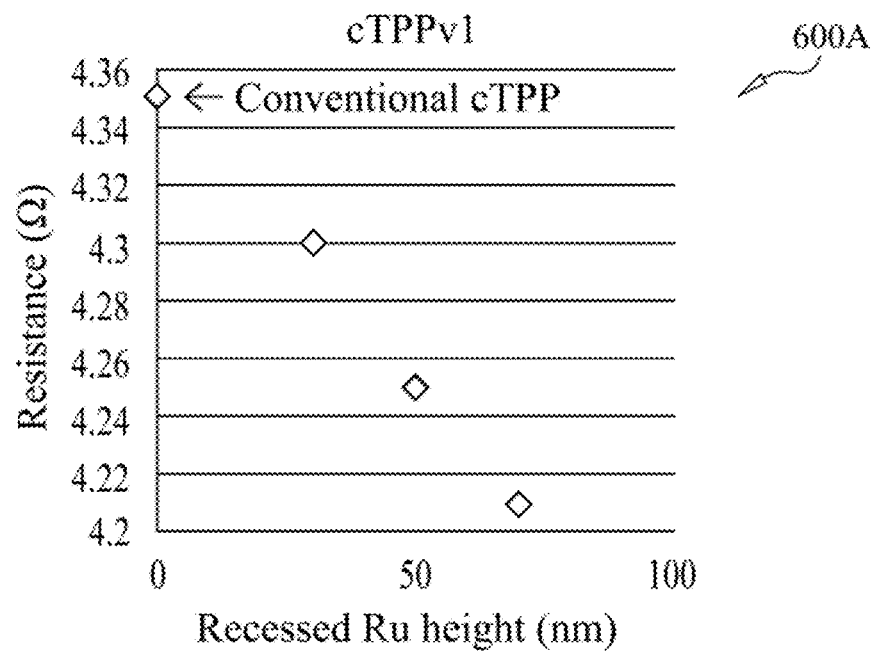
FIG. 6A is a graphical representation of an example cTPPv1 structure as a function of the recessed Ru height according to an embodiment.
Figure 6B:
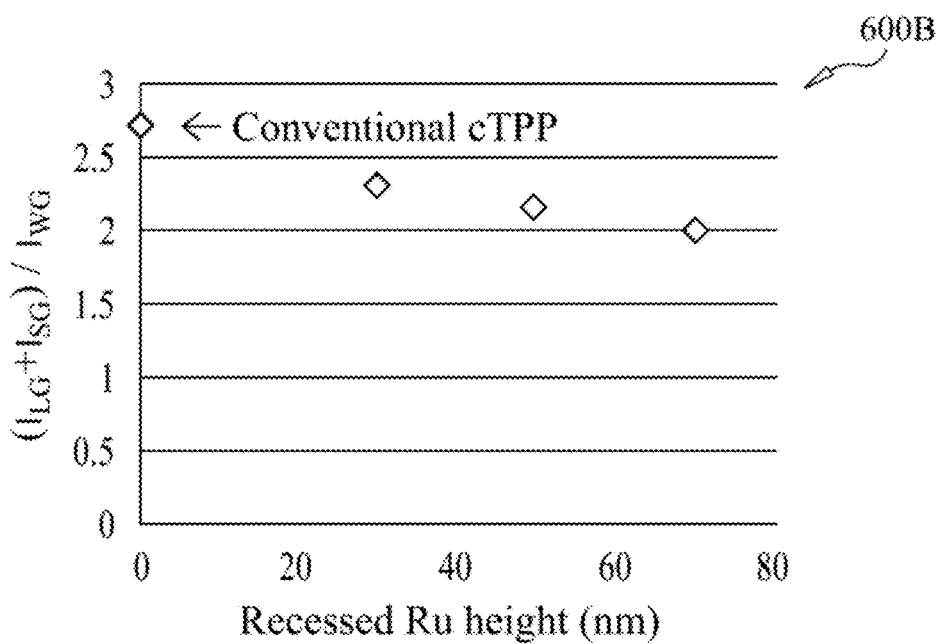
FIG. 6B is a graphical representation of an example bias current distribution ratio in the side+leading gaps to write gap as a function of the recessed Ru height according to an embodiment.

When the recessed TPP Ru height of a cTPPv1 structure is 0 nm, the height can correspond to another cTPP structure. For instance, the baseline resistance for another cTPP structure with POR dimensions can be around ~4 02. Additional recessed Ru height may not change the resistance significantly, even up to a height of 70 nm, as shown in FIG. 6A, for example. This can be because the resistance is dominantly determined by the SG and LG material contact area, and the recessed part does not help in further decreasing the device resistance. However, the recessed Ru can further enhance the contact area on the WG side and allows more current into the WG compared to the baseline cTPP. For POR dimensions, the recessed Ru of 70 nm can enhance the SG+LG current to WG current ratio to ~2 from the conventional cTPP value of ~2.7, as shown in FIG. 6B, for example.

FIG. 6A is a graphical representation 600A of an example cTPPv1 structure as a function of the recessed Ru height. FIG. 6B is a graphical representation 600B of an example bias current distribution ratio in the side+leading gaps to write gap as a function of the recessed Ru height. The recessed Ru in WG can help optimize the bias current distribution for maximizing the ADC gain in a cTPP-family design.

In a first example embodiment, a write head for a disk drive is provided. The write head can include a main pole (MP) configured to provide a magnetic flux to a recording medium. The write head can also include a trailing shield (TS) comprising a hot seed (HS) and write shield (WS) to collect a portion of the flux from the MP. The write head can also include a write gap (WG) disposed between the MP and TS. The WG can include a non-magnetic electrically conductive material.

The write head can also include a side shield (SS), a leading shield (LS), and a write shield (WS) each comprising a magnetic material that prevents magnetic flux from reaching the medium bits away from the MP. The write head can also include a side gap (SG) between the MP and the SS on multiple sides of the MP. The SG can include a non-magnetic material that is a conductor or an insulator. The write head can also include a leading gap (LG) between the MP and the LS, the LG comprising a same material as the SG.

In some instances, a length of the WG is disposed along a length of the SS and the LS and is about equal to a length of the HS.

In some instances, a thickness of the WG is about equal to a thickness of the HS.

In some instances, a height of the WG is greater than an eTHd height of the HS, which is configured to increase an electrical contact area between the HS and MP for a bias current flow.

In some instances, the WG comprises a first part extending an air-bearing surface (ABS) plane of the write head to a top of the eTHd height and a second part extending from the top of the eTHd height.

In some instances, a thickness of the first part of the WG is uniform across the ABS plane to the eTHd height. Further, a thickness of the second part of the WG can increase with the height of the WG and is based on a shape of the HS.

In some instances, the LG and the SG comprise an electrical insulator material comprising aluminum oxide ($Al_2O_3$).

In some instances, the LG and the SG comprise an electrical conductor comprising Ruthenium (Ru) or a Nickel-Chromium (NiCr)/Ruthenium (Ru) multilayer.

In another example embodiment, a device is provided. The device can include a main pole (MP) and a trailing shield (TS) comprising a hot seed (HS) and write shield (WS). The device can also include a write gap (WG) disposed between the MP and TS, The WG can include a first part extending from an air-bearing surface ABS plane to a top of a eTHd height of the HS, and a second part from the top of the eTHd height.

The device can also include a side shield (SS), a leading shield (LS), and a write shield (WS). The device can also include a side gap (SG) between the MP and the SS on multiple sides of the MP. The device can also include a leading gap (LG) between the MP and the LS.

In some instances, a length of the WG is disposed along a length of the SS and the LS and is about equal to a length of the HS.

In some instances, a height of the WG is greater than the eTHd height of the HS, which is configured to increase an electrical contact area between the HS and MP for a bias current flow.

In some instances, a thickness of the first part of the WG is uniform across the ABS plane to the eTHd height and a thickness of the second part of the WG increases with the height of the WG and is based on a shape of the HS.

In some instances, the LG and the SG comprise an electrical insulator material comprising aluminum oxide ($Al_2O_3$).

In some instances, the LG and the SG comprise an electrical conductor comprising Ruthenium (Ru) or a Nickel-Chromium (NiCr)/Ruthenium (Ru) multilayer.

In another example, a method for manufacturing a write head for a disk drive is provided. The method can include providing a main pole (MP) configured to provide a magnetic flux to a recording medium. The method can also include disposing a trailing shield (TS) comprising a hot seed (HS) and write shield (WS) to collect a portion of the flux from the MP. The method can also include disposing a write gap (WG) between the MP and TS, wherein the WG comprises a non-magnetic electrically conductive material. The method can also include providing each of a side shield (SS), a leading shield (LS), and a write shield (WS) to prevent magnetic flux from reaching the medium bits away from the MP. The method can also include disposing a side gap (SG) between the MP and the SS. The method can also include disposing a leading gap (LG) between the MP and the LS.

In some instances, a length of the WG is about equal to a length of the HS.

In some instances, a height of the WG is greater than an eTHd height of the HS, which is configured to increase an electrical contact area between the HS and MP for a bias current flow.

In some instances, the WG comprises a first part extending an air-bearing surface (ABS) plane of the write head to a top of the eTHd height and a second part extending from the top of the eTHd height.

In some instances, a thickness of the first part of the WG is uniform across the ABS plane to the eTHd height, and a thickness of the second part of the WG increases with the height of the WG and is based on a shape of the HS.

In some instances, the LG and the SG comprise an electrical insulator material comprising aluminum oxide ($Al_2O_3$) or an electrical conductor comprising Ruthenium (Ru) or a Nickel-Chromium (NiCr)/Ruthenium (Ru) multilayer.

It will be understood that terms such as "top," "bottom," "above," "below," and x-direction, y-direction, and z-direction as used herein as terms of convenience that denote the spatial relationships of parts relative to each other rather than to any specific spatial or gravitational orientation. Thus, the terms are intended to encompass an assembly of component parts regardless of whether the assembly is oriented in the particular orientation shown in the drawings and described in the specification, upside down from that orientation, or any other rotational variation.

It will be appreciated that the term "present invention" as used herein should not be construed to mean that only a single invention having a single essential element or group of elements is presented. Similarly, it will also be appreciated that the term "present invention" encompasses a number of separate innovations, which can each be considered separate inventions. Although the present invention has been described in detail with regards to the preferred embodiments and drawings thereof, it should be apparent to those skilled in the art that various adaptations and modifications of embodiments of the present invention may be accomplished without departing from the spirit and the scope of the invention. Accordingly, it is to be understood that the detailed description and the accompanying drawings as set forth hereinabove are not intended to limit the breadth of the present invention, which should be inferred only from the following claims and their appropriately construed legal equivalents.

What is claimed is:

1. A write head for a disk drive, the write head comprising:
    a main pole (MP) configured to provide a magnetic flux to a recording medium;
    a trailing shield (TS) comprising a hot seed (HS) and write shield (WS) to collect a portion of the flux from the MP;
    a write gap (WG) disposed between the MP and TS, wherein the WG comprises a non-magnetic electrically conductive material;
    a side shield (SS), a leading shield (LS), and a write shield (WS) each comprising a magnetic material that prevents magnetic flux from reaching the medium bits away from the MP, wherein a length of the WG is disposed along a length of the SS and the LS and is about equal to a length of the HS;
    a side gap (SG) between the MP and the SS on multiple sides of the MP, wherein the SG comprises a non-magnetic material that is a conductor or an insulator; and
    a leading gap (LG) between the MP and the LS, the LG comprising a same material as the SG.

2. The write head of claim 1, wherein a thickness of the WG is about equal to a thickness of the HS.

3. The write head of claim 1, wherein a height of the WG is greater than an extended throat (eTHd) height of the HS, which is configured to increase an electrical contact area between the HS and MP for a bias current flow.

4. The write head of claim 3, wherein the WG comprises:
    a first part extending an air-bearing surface (ABS) plane of the write head to a top of the eTHd height; and
    a second part extending from the top of the eTHd height.

5. The write head of claim 4, wherein a thickness of the first part of the WG is uniform across the ABS plane to the eTHd height, and wherein a thickness of the second part of the WG increases with the height of the WG and is based on a shape of the HS.

6. The write head of claim 1, wherein the LG and the SG comprise an electrical insulator material comprising aluminum oxide ($Al_2O_3$).

7. The write head of claim 1, wherein the LG and the SG comprise an electrical conductor comprising Ruthenium (Ru) or a Nickel-Chromium (NiCr)/Ruthenium (Ru) multilayer.

8. A device comprising:
a main pole (MP);
a trailing shield (TS) comprising a hot seed (HS) and write shield (WS);
a write gap (WG) disposed between the MP and TS, wherein the WG comprises a first part extending from an air-bearing surface ABS plane to a top of a eTHd height of the HS, and a second part from the top of the eTHd height;
a side shield (SS), a leading shield (LS), and a write shield (WS), wherein a length of the WG is disposed along a length of the SS and the LS is about equal to a length of the HS;
a side gap (SG) between the MP and the SS on multiple sides of the MP; and
a leading gap (LG) between the MP and the LS.

9. The device of claim 8, wherein a height of the WG is greater than the eTHd height of the HS, which is configured to increase an electrical contact area between the HS and MP for a bias current flow.

10. The device of claim 8, wherein a thickness of the first part of the WG is uniform across the ABS plane to the eTHd height, and wherein a thickness of the second part of the WG increases with the height of the WG and is based on a shape of the HS.

11. The device of claim 8, wherein the LG and the SG comprise an electrical insulator material comprising aluminum oxide ($Al_2O_3$).

12. The device of claim 8, wherein the LG and the SG comprise an electrical conductor comprising Ruthenium (Ru) or a Nickel-Chromium (NiCr)/Ruthenium (Ru) multilayer.

13. A method for manufacturing a write head for a disk drive, the method comprising:
providing a main pole (MP) configured to provide a magnetic flux to a recording medium;
disposing a trailing shield (TS) comprising a hot seed (HS) and write shield (WS) to collect a portion of the flux from the MP;
disposing a write gap (WG) between the MP and TS, wherein the WG comprises a non-magnetic electrically conductive material;
providing each of a side shield (SS), a leading shield (LS), and a write shield (WS) to prevent magnetic flux from reaching the medium bits away from the MP;
disposing a side gap (SG) between the MP and the SS; and
disposing a leading gap (LG) between the MP and the LS.

14. The method of claim 13, wherein a length of the WG is about equal to a length of the HS.

15. The method of claim 13, wherein a height of the WG is greater than an eTHd height of the HS, which is configured to increase an electrical contact area between the HS and MP for a bias current flow.

16. The method of claim 15, wherein the WG comprises a first part extending an air-bearing surface (ABS) plane of the write head to a top of the eTHd height and a second part extending from the top of the eTHd height.

17. The method of claim 16, wherein a thickness of the first part of the WG is uniform across the ABS plane to the eTHd height, and wherein a thickness of the second part of the WG increases with the height of the WG and is based on a shape of the HS.

18. The write head of claim 1, wherein the LG and the SG comprise an electrical insulator material comprising aluminum oxide ($Al_2O_3$) or an electrical conductor comprising Ruthenium (Ru) or a Nickel-Chromium (Chromium) Ru (NiCr/Ru) multilayer.

* * * * *